United States Patent
Deng

(10) Patent No.: US 7,227,875 B2
(45) Date of Patent: Jun. 5, 2007

(54) INTERFACING TO A DATA FRAMER

(75) Inventor: Dan Z. Deng, Hayward, CA (US)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 10/160,550

(22) Filed: May 30, 2002

(65) Prior Publication Data

US 2003/0223469 A1    Dec. 4, 2003

(51) Int. Cl.
   *H04J 3/24*   (2006.01)
   *H04J 3/02*   (2006.01)

(52) U.S. Cl. ........................... 370/474; 370/542

(58) Field of Classification Search ............... None
See application file for complete search history.

(56) References Cited

U.S. PATENT DOCUMENTS

| 5,867,543 A | * | 2/1999 | Roberts et al. | ............. 375/365 |
| 6,097,735 A | * | 8/2000 | Nemoto | ...................... 370/476 |
| 6,400,291 B1 | * | 6/2002 | Sankey | ...................... 341/100 |

* cited by examiner

*Primary Examiner*—Huy D. Vu
*Assistant Examiner*—Daniel Ryman
(74) *Attorney, Agent, or Firm*—Fish & Richardson P.C.

(57) ABSTRACT

A method of transferring a serial data stream to a data framer includes converting the serial data stream to parallel data streams. The parallel data streams are synchronized and formed into one or more groups of synchronized parallel data streams. The one or more groups of synchronized parallel data streams are then transferred to the data framer at a transfer rate determined by the forming of the one or more groups.

12 Claims, 8 Drawing Sheets

INTERFACING TO A DATA FRAMER

TECHNICAL FIELD

This application relates to interfacing to a data framer.

BACKGROUND

Transmission protocols, such as SONET (Synchronous Optical Networking) and SDN (Synchronous Digital Hierarchy), transmit data in structured frames. These data frames are transmitted over an optical network in a serial data stream. A converting device, at the termination of the optical network converts the serial data stream to parallel data streams. Once converted, the parallel data streams are transferred by the converting device to a SONET/SDH framer at an Optical Carrier (OC) Level data rate.

DESCRIPTION OF DRAWINGS

Like reference symbols in the various drawings indicate like elements.

DESCRIPTION

Figure 1:
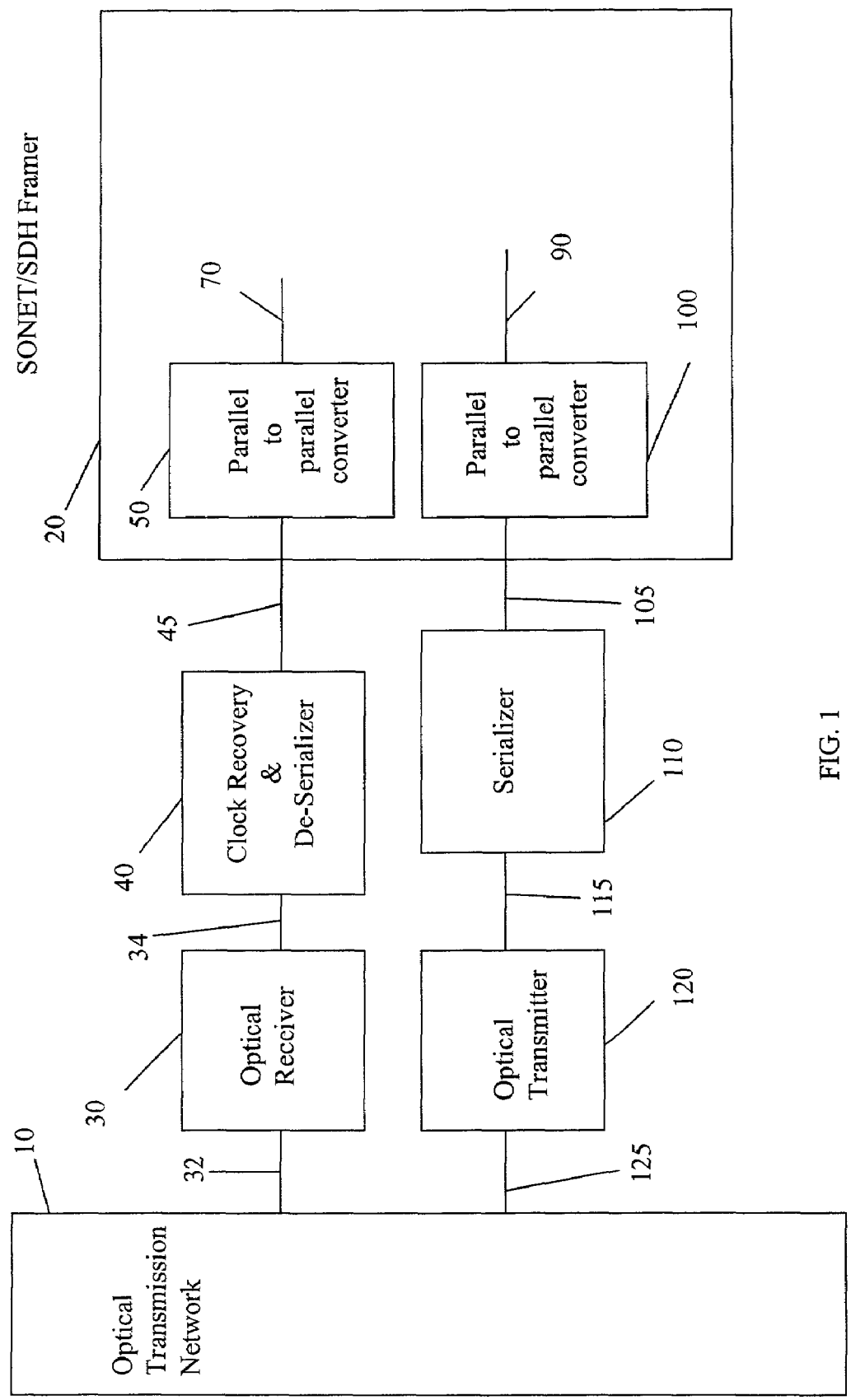
FIG. 1 illustrates an interface between an optical transmission network and a SONET/SDH framer.

As will be described in greater detail below, a method of transferring a serial data stream to a data framer includes converting the serial data stream to parallel data streams. The parallel data streams are synchronized and formed into one or more groups of synchronized parallel data streams. The one or more groups of synchronized parallel data streams are transferred to the data framer at a transfer rate determined by the forming of the one or more groups.

Typically data is transmitted over an optical transmission network in SONET/SDH frames within a serial data stream. Once received by a data framer, such as a SONET/SDH framer, which is connected to the optical transmission network, information is retrieved from the received SONET/SDH frames. However, in order to interface the optical transmission network to the SONET/SDH framer, the serial data stream is de-serialized into parallel data streams. Along with de-serializing, the OC level of the parallel data streams may be changed for more efficient SONET/SDH frame transferring to the SONET/SDH framer.

OC levels for interfacing a SONET/SDH framer to an optical transmission network are typically multiples of a base OC level. For example, a base OC level may be optical carrier level 1 (OC-1), which corresponds to a data rate of 51.84 mega bits per second (Mbps). From the OC-1 base, OC levels are typically increased in multiples of this base rate, such as, OC-12 (622.08 Mbps), OC-48 (2.488 Giga bits per second, Gbps), or OC-192 (10 Gbps). By changing the OC level, SONET/SDH frames transferring between the optical transmission network and the SONET/SDH framer may be configured for faster and more efficient transferring.

To transfer data at various OC levels, configurable circuitry may interface the optical transmission network and the SONET/SDH framer. By using configurable circuitry, SONET/SDH frames may be passed at various OC levels without additional circuitry dedicated to each particular OC level. Configurable circuitry also reduces the number of signal lines between front-end buffers and the high-speed interface. Reducing the number of signal lines reduces electromagnetic cross-talk and power consumption. Also, by interfacing with configurable circuitry, less layout (die area) is populated while still providing multiple OC levels. Thus, less circuitry may result in less complexity, less hardware, and less cost, while providing multiple OC levels for interfacing the optical transmission network to the SONET/SDH framer.

The OC level of parallel data streams may be varied by synchronizing and grouping individual parallel data streams. Synchronizing the individual parallel data streams references each data stream to a common timing signal. Assigning the synchronized parallel data streams to groups sums the individual OC levels into a combined OC level. Thus, grouping of the individual synchronized data streams controls the OC level of the grouped parallel data streams. For example, a 16-byte wide parallel stream having sixteen individual streams operating at OC-12 (622.08 Mbps) may be synchronized to a common timing signal and assigned to one group. The one group operating OC level is the combination of the sixteen individual OC levels, or OC-192 (10 Gbps). In another example, the sixteen individual streams may be assigned to 4 independent groups each containing four individual streams that are synchronous. Again, each individual stream operates at an OC-12 rate. The operating OC level of each of the four groups is the combination of the OC levels of the streams assigned to the group. For this example, each group's data rate is OC-48 (2.488 Gbps). Thus, by synchronizing the individual parallel data streams and controlling the grouping of the parallel data streams, the operating OC-level is configurable without adding circuitry for each OC-level.

By grouping synchronized data streams, different operating modes may be generated for use in interfacing between the optical transmission network and the SONET/SDH framer. For example, after synchronizing the 16 parallel data streams, again each operating at OC-12, the 16 streams may be assigned to one group (1 channel). This 1 channel operates at OC-192 and provides a 1×OC-192 mode. In another example, assigning the synchronized 16 data streams, again each operating at OC-12, into four independent groups of 4 data streams provides four channels operating at OC-48 (mode 4×OC-48). In this example each of the four channels can independently operate as a single channel (mode 1×OC-48). In still another example, each of the 16 data streams may be assigned to sixteen independent groups, each including 1 independent data stream. Thus, sixteen independent data streams may be grouped into sixteen channels, with each channel operating at OC-12 (mode 16×OC-12).

Referring to FIG. 1, SONET/SDH framer 20 is shown interfacing to optical transmission network 10. Optical transmission network 10 connects to optical receiver 30 with an optical transmission medium 32, such as fiber optic cable. SONET/SDH frames are received by optical receiver 30 within a serial data stream. Optical receiver 30 receives the serial data stream as optical signals and converts the optical signals into electrical signals which include the serial data stream. The electrical signals are transmitted over electrical receive cable 34 to clock recovery and de-serializer 40.

Clock recovery and de-serializer 40 receives the serial data stream from optical receiver 30 at a relatively high-rate, such as OC-192 (10 Gbps). Along with recovering a clock reference, clock recovery and de-serializer 40 converts the serial data stream into a 16-bit wide parallel data stream. The 16-bit wide parallel data stream is typically transmitted from de-serializer 40 at an intermediate-rate (which is lower than the high-rate), such as OC-12 (622.08 Mbps). However, values for the high-rate and the intermediate-rate may vary based on characteristics of optical transmission network 10 and SONET/SDH framer 20.

Clock recovery and de-serializer 40 transmits the 16-bit wide parallel data stream to SONET/SDH framer 20 over data bus 45. Parallel-to-parallel converter 50 receives the intermediate-rate 16-bit wide parallel data stream and expands the number of data streams carrying the electrical signals and lowers the data rate of the data streams. For example, the 16-bit wide parallel data stream, transmitted at 622.08 Mbps (OC-12), may be converted to a 128-bit wide parallel data stream with a 77.76 Mbps data rate. Parallel-to-parallel converter 50 also groups the parallel data streams for efficient data transfer.

Figure 2:
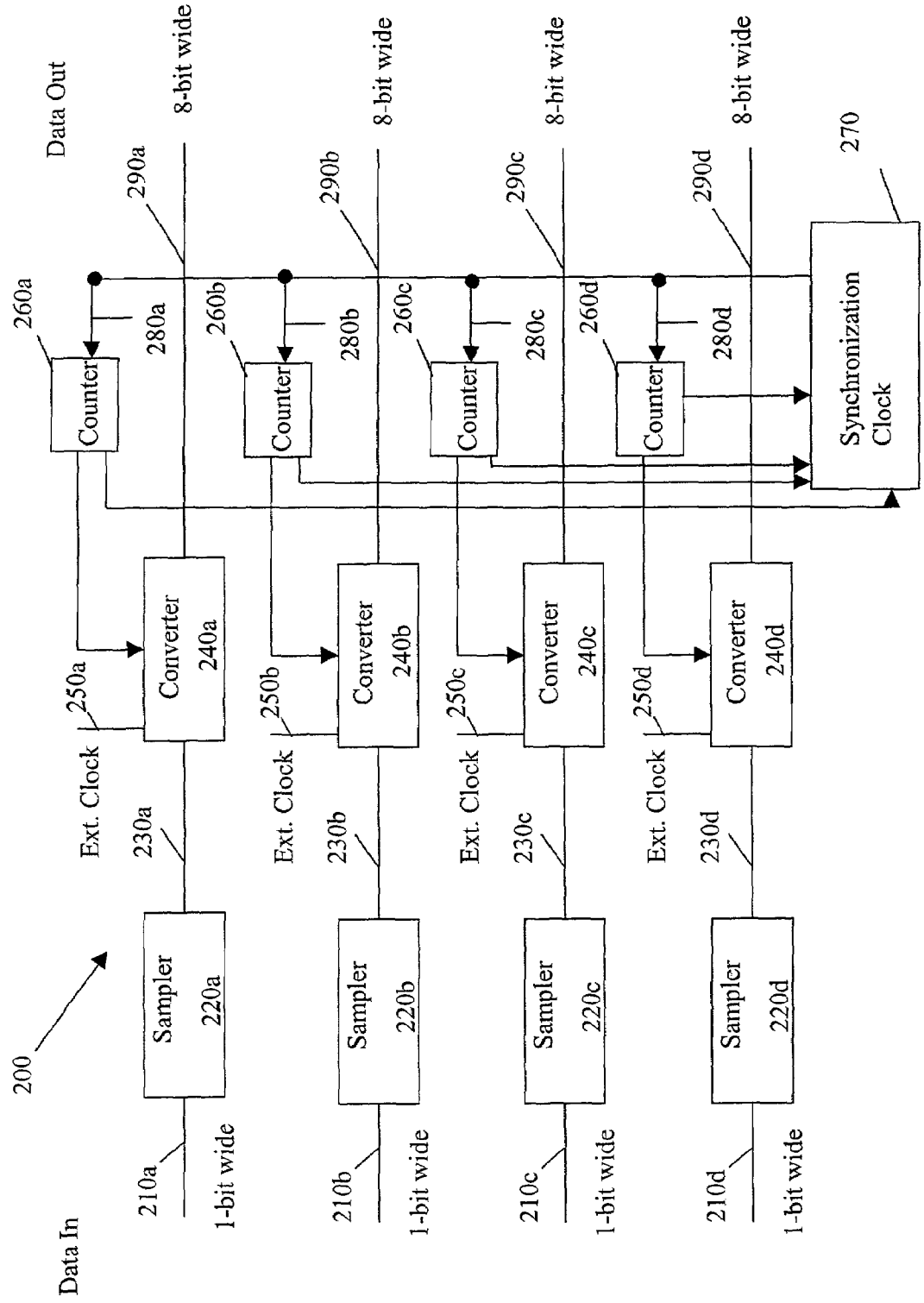
FIG. 2 illustrates a block diagram of a portion of a 16-bit wide parallel to 128-bit wide parallel converter.

Referring to FIG. 2, parallel-to-parallel converter 200 converts 4-bit wide parallel data streams (a portion of the 16-bit wide parallel input data stream) into 32-bit wide data streams (a portion of the 128-bit output data stream) by first separating the 4-bit wide data stream into four sub-streams each 1-bit wide. Each 1-bit wide sub-stream is received on 1-bit wide buses 210a–d. Each 1-bit wide bus 210a–d is connected to a corresponding sampler stage 220a–d that recovers the 1-bit wide data sub-streams and corrects any skew in the data. Sampler stages 220a–d provide proper data transferring in order to meet the timing specifications of OIF-SFI4-01.0 (OC-192 Serdes-Framer Interface) OIF-PLL-02.0-Proposal for a common electrical interface between SONET framer and serialer/deserializer parts for OC-192 interfaces, published 26 Sep. 2000.

After data recovery by sampler stages 220a–d, the 1-bit wide parallel sub-streams are transmitted over 1-bit wide data buses 230a–d and are received by parallel-to-parallel converters 240a–d. Parallel-to-parallel converters 240a–d convert the 1-bit wide parallel sub-streams, with a 622.08 Mbps (OC-12) data rate, into 8-bit wide parallel sub-streams, with a 77.76 Mbps data rate.

Timing signals for controlling converters 240a–d may be provided, for example, by external or internal clocks. For example, an external clock may provide a 77.76 MHz signal to each converter 240a–d via external clock lines 250a–d. For internal timing signals, 77.76 MHz timing signals may be generated by counters 260a–d that are connected to corresponding converters 240a–d. In order to convert the 1-bit wide parallel sub-streams into 8-bit wide parallel sub-streams, each converter 240a–d includes a 1-bit wide to 8-bit wide parallel-to-parallel converter.

Figure 3:
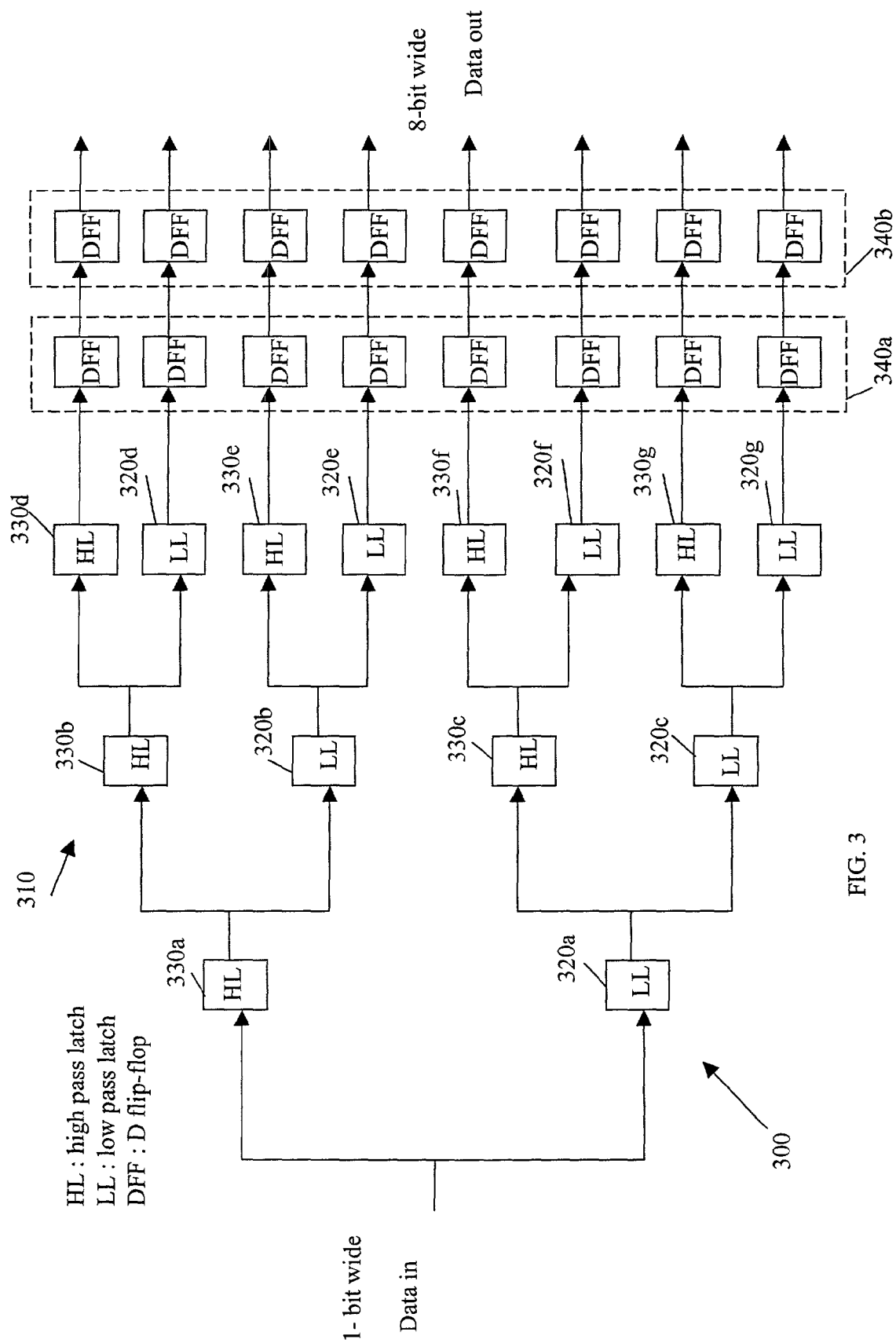
FIG. 3 illustrates a block diagram of a 1-bit wide parallel to 8-bit wide parallel converter.

Referring to FIG. 3, a block diagram of a 1-bit wide to 8-bit wide parallel-to-parallel converter 300 is shown. A latch tree structure 310 includes low-pass latches 320a–g and high-pass latches 330a–g that split the 1-bit wide 622.08 Mbps sub-stream into an 8-bit wide sub-stream with a 77.76 Mbps data rate. Two sets of D flip-flops 340a,b byte sample the 8-bit wide sub-streams for signal conditioning prior to outputting the sub-streams.

Timing signals from external clock lines 250a–d or connected counters 260a–d (shown in FIG. 2) control the operation of latch tree structure 310. Counters 260a–d also compensate for timing delays due to latch tree structure 310. Thus, counters 260a–d provide delay matching between the latch tree timing signals and the 1-bit wide sub-streams.

Returning to FIG. 2, to group the output streams for a particular transfer mode, converters 240a–d synchronize the output streams by connecting counters 260a–d to a reference clock, such as synchronization clock 270. Synchronization clock 270 receives feedback from counter 260a–d to provide a timing reference signal over signal lines 280a–d to each corresponding counter 260a–d. Each counter 260a–d then provides the timing signals, based on the reference provided by synchronization clock 270, to corresponding converters 240a–d which synchronize the latch trees and thereby synchronize the parallel data streams. The resulting 32-bit data streams, from combining the four 8-bit parallel data streams, are synchronized and placed on bus lines 290a–d. By synchronizing, random error and initial counter 260a–d timing uncertainties are cleared while also accounting for counter and route placements.

After synchronizing, the 32-bit wide stream on bus lines 290a–d may be combined with the remaining three 32-bit wide data streams not shown to form a 128-bit wide data stream on data bus 45, shown in FIG. 1, and transmitted over data bus 45.

Figure 4:
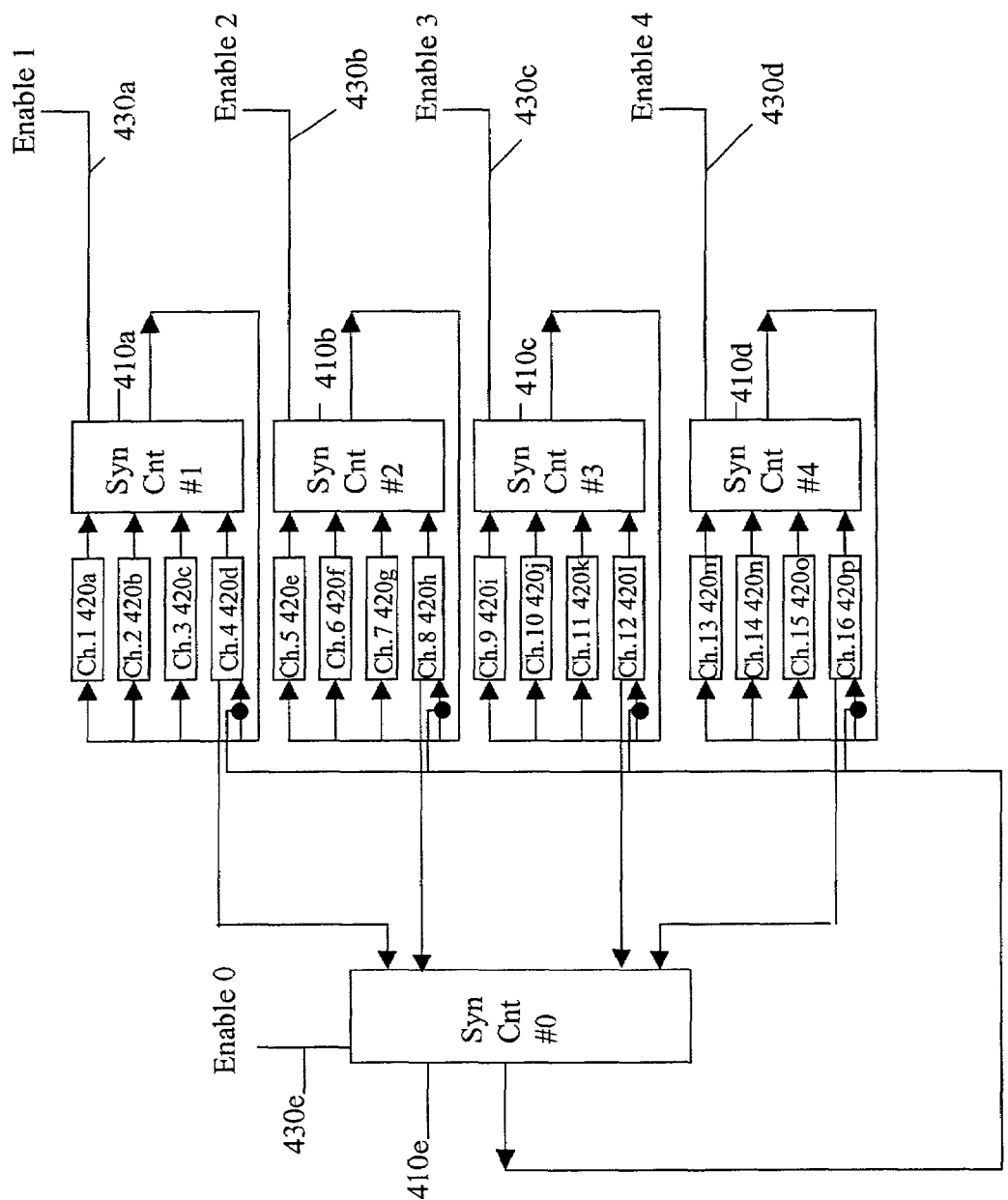
FIG. 4 illustrates a synchronization control state diagram.

Referring to FIG. 4, a block diagram of a synchronization control state diagram is shown. Synchronous control blocks 410a–e use feedback to control the grouping of sixteen channels 420a–p, which each correspond to an 8-bit wide data stream, to provide the transmission modes. Each synchronous control block 410a–e is individually controlled by a respective enable line 430a–e. When enabled the synchronous control blocks 410a–e synchronize the channels associated with the particular control block. For example, synchronous control block #1 410a synchronizes, when enabled, channels 1–4, by providing a synchronizing timing signal from synchronization clock 270 to counters 260a–d (shown in FIG. 2). Based on enabling synchronous control blocks 410a–e, different transmission mode may be configured.

Transmission modes are controlled by enabling the individual synchronous control blocks 410a–e. For example, disabling all of the synchronous control blocks 410a–e causes all sixteen channels 420a–p to operate independent with a data rate of 622.08 Mbps (OC-12), or mode 16×OC-12.

In another example, synchronous control block #1 410a, synchronous control block #2 410b, synchronous control block #3 410c, and synchronous control block #4 410d may be enabled and synchronous control block #0 410e may be disabled. For this example, synchronous control block #1 410a provides feedback to synchronize channels 1–4 420a–d, synchronous control block #2 410b provides feedback to synchronize channels 5–8 420e–h, synchronous control block #3 410c provides feedback to synchronize channels 9–12 420i–l, and synchronous control block #4 410d provides feedback to synchronize channels 13–16 420m–p. Thus the sixteen channels form four groups each containing four channels and each group's data rate is 2.488 Mbps (OC-48), known as mode 4×OC-48.

In still another example, all of the synchronous control blocks #0–#4 410a–e may be enabled and synchronize channels 1–16 420a–p. Synchronous control block #0 410e provides feedback, for example, between channels 4 420d, 8 420h, 12 420l, and 16 420p that in turn synchronize the remaining channels through the feedback provided by synchronous control blocks #1–#4 410a–d. Thus, one group is formed of sixteen channels and has a data rate of 10 Gps (OC-192), also known as mode 1×OC-192. Thus, the data rate is configurable based on the grouping of the 8-bit wide channels 420a–p without adding circuitry for each data rate.

Figure 5:
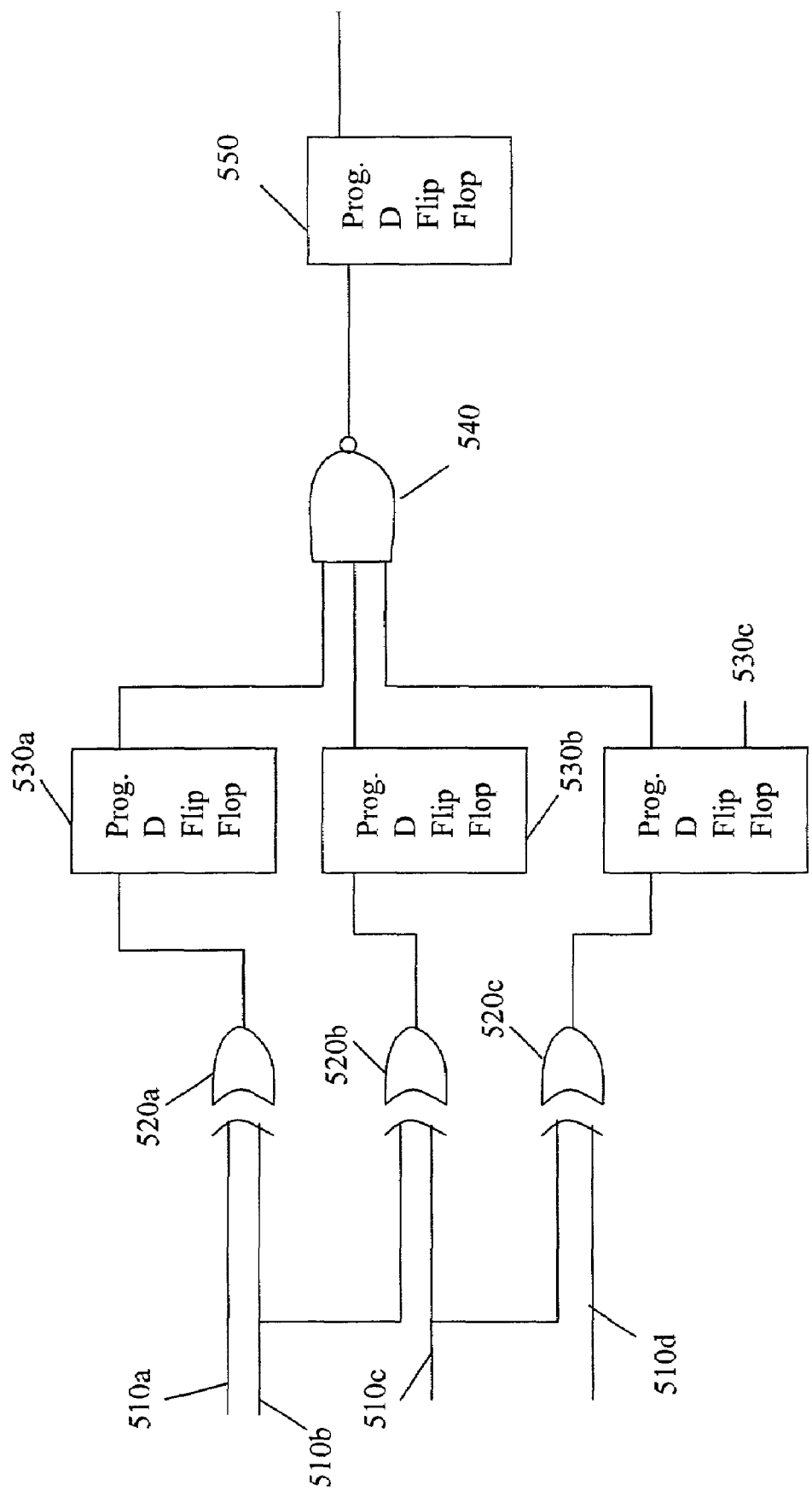
FIG. 5 illustrates a block diagram of a synchronization clock.

Referring to FIG. 5, a block diagram of synchronization clock 270 (shown in FIG. 2) is shown. In this example, outputs of counters 440a–d (shown in FIG. 2) are connected to input lines 510a–d that connect to three "exclusive-or" logic gates 520a–c. Outputs of "exclusive-or" logic gates 520a–c are connected to inputs of three programmable D Flip-Flops 530a–c with outputs connected to a three-input "nand" logic gate 540. Output of "nand" logic gate 540 connects to programmable D flip-flop 550 which outputs synchronizing timing signals to signal lines 280a–d (shown in FIG. 2).

Returning to FIG. 1, after forming the groups for efficient data transferring, the groups may be placed on receive data bus 70 which transfers the groups within the SONET/SDH framer 20 for further processing.

In a similar, but reversed process, SONET/SDH frames may be transferred from the SONET/SDH framer 20 to the optical transmission network 10.

For example, after processing received SQNET/SDH frames, the SONET/SDH framer 20 may transfer groups of parallel data streams over transmit bus 90 to parallel-to-parallel converter 100 for ungrouping the groups. By ungrouping the parallel data streams, the data transmission rate is reduced from the grouped rate (e.g., 10 Gbps for mode 1×OC-192) to the low-rate of 77.76 Mbps for each 1-bit wide sub-stream. Parallel-to-parallel converter 100 also converts sixteen 8-bit wide channels, with a 77.76 Mbps data rate, to 16-bit wide parallel data stream, operating at 622.08 Mbps.

Figure 6:
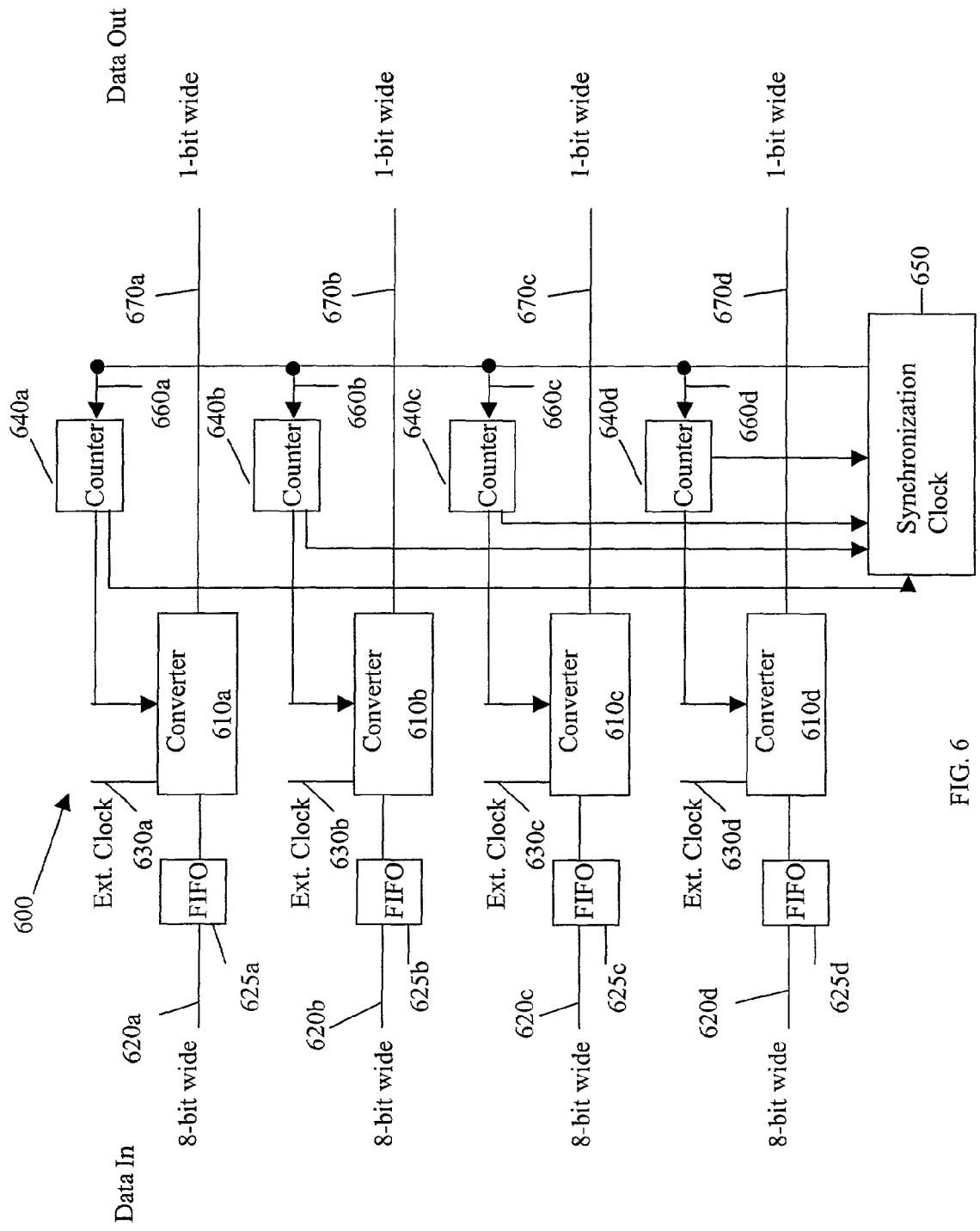
FIG. 6 illustrates a block diagram of a portion of a 128-bit wide parallel to 16-bit wide parallel converter.

Referring to FIG. 6, a block diagram of 32-bit (four channel) to 4-bit parallel-to-parallel converter 600 is shown and includes four 8-bit-to-1-bit parallel-to-parallel converters 610a–d, and first-in-first-out (FIFO) circuit 625a–d. Each converter 610a–d receives an 8-bit wide parallel data sub-stream and outputs a 1-bit wide parallel data sub-stream. In aggregate, the four 1-bit wide parallel data sub-streams form a 4-bit wide portion of the 16-bit wide data stream output of the parallel-to-parallel converter 100 (shown in FIG. 1). Similar to parallel-to-parallel converter 50 (shown in FIG. 1), timing signals for parallel-to-parallel converter 600 may be generated internally or externally.

Timing signals generated by an external clock, or clocks, are received by the converters 610a–d on external clock lines 630a–d. However, counters 640a–d may internally generate the timing signals within the parallel-to-parallel converter 600. Each counter 640a–d connects to and may generate the timing signals for a corresponding converter 610a–d. Similar to the receive side counters, a common reference clock may connect to each counter 640a–d to synchronize the operation of the converters 610a–d. For example, synchronization clock 650 may receive feedback from the counters 640a–d and connect to each counter 640a–d over timing lines 660a–d. By connecting the counters 640a–d to the common reference, the converters 610a–d operate synchronously. Also, similar to the receive side counters, counters 640a–d may operate, for example, on a falling edge of a 622.08 MHz reference signal or may operate on both a rising edge and a falling edge of a 311.04 MHz reference signal.

Figure 7:
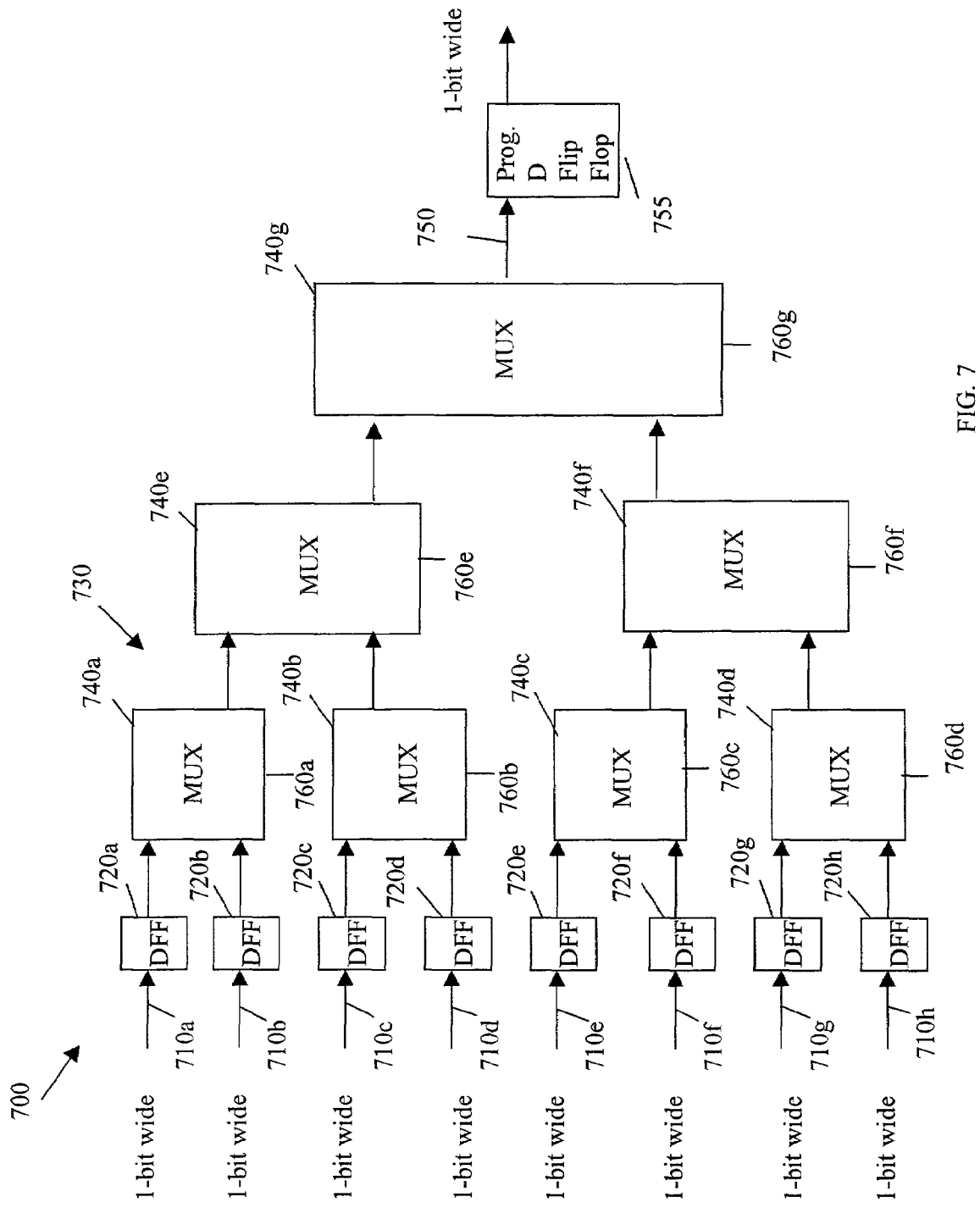
FIG. 7 illustrates a block diagram of an 8-bit wide parallel to 1-bit wide parallel converter.

Each converter 610a–d includes, for example, an 8-bit to 1-bit converters for converting the 8-bit wide parallel data streams on input data buses 620a–d into 1-bit wide data streams on output data buses 670a–d. Referring to FIG. 7, a block diagram for an 8-bit to 1-bit converter 700 is shown.

After receiving the 8-bit wide data sub-stream on eight data lines 710a–h, the data is sampled by D flip-flops 720a–h for signal conditioning. Outputs of the D flip-flops 720a–h are multiplexed by a multiplexer tree structure 730 that includes a series of multiplexers 740a–g. By multiplexing the input data from the eight parallel data lines 710a–h, the input data is placed on one output data line 750 which transmits the data to programmable D flip-flip 755 for conditioning prior to leaving converter 700. Clock lines 760a–g provide timing signals to multiplexers 740a–g from the corresponding external clock lines 630a–d or counters 640a–d shown in FIG. 6. Returning to FIG. 6, each converter 610a–d outputs a 1-bit wide data stream on output buses 670a–d. In aggregate, the four 1-bit wide output buses 670a–d form a portion of the 16-bit wide data bus 105, which outputs parallel-to-parallel converter 100, as shown in FIG. 1.

Figure 8:
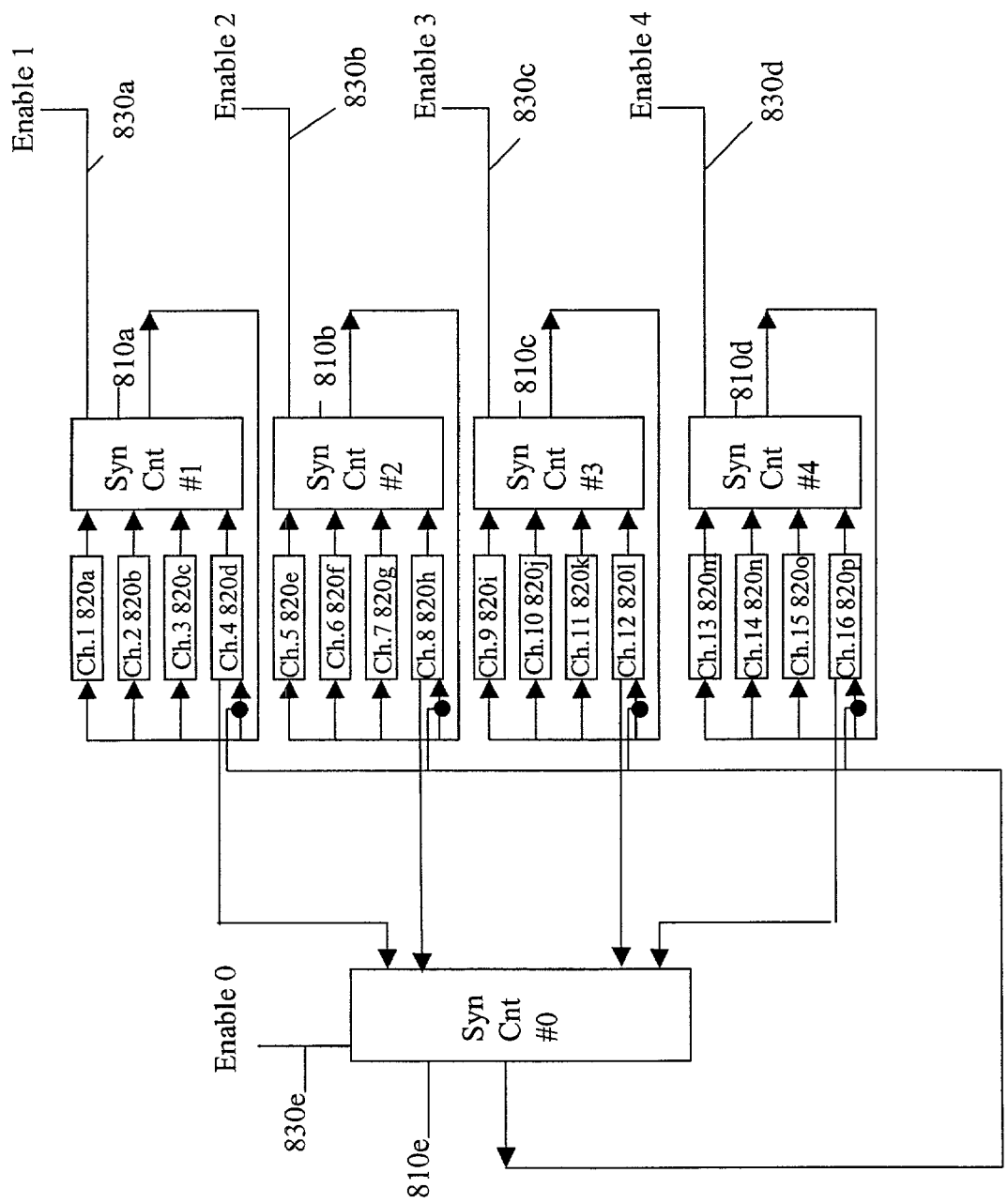
FIG. 8 illustrates a synchronization control state diagram.

Referring to FIG. 8, a block diagram of the synchronization control state diagram for parallel-to-parallel converter 600 (shown in FIG. 6) is shown. Similar to the state diagram shown in FIG. 4, synchronizing of the sixteen 8-bit wide channels is controlled by synchronous control blocks #0–#4 810a–e. However, channels are typically transmitted unsynchronized prior to transmitting to serializer 110 (shown in FIG. 1). For example, channels 1–16 820a–p may be synchronized for mode 1×OC-192 prior to entering parallel-to-parallel converter 100 (shown in FIG. 1). By disabling synchronous control blocks #0–#4 810a–e the sixteen channels operate independently and at a data rate of 622.08 Mbps (OC-12). Similar to the state diagram in FIG. 4, the channels may be synchronized for other modes such as 4×OC-48 or other modes. Also similar to the state diagram in FIG. 4, enable lines 830a–e control the functioning of the synchronous control blocks #0–#4 810a–e. Returning to FIG. 6, in one implementation synchronization clock 650 may be equivalent to the block diagram shown in FIG. 5.

Returning to FIG. 1, after converter 100 converts the parallel data stream from sixteen 8-bit wide channels, with a data rate of 77.76 MHz per bit, to a 16-bit wide parallel data stream, with a data rate of 622.08 MHz per bit, the 16-bit wide data stream transfers over data bus 105 to serializer 110. Serializer 110 receives the 16-bit wide parallel data stream and converts the parallel data stream into a serial data stream. Typically the serial data stream has a high data rate, for example 10 Gbps (OC-192), and the serial data stream transmits over cable 115 from serializer 110 to optical transmitter 120. Optical transmitter 120 converts the serial data stream from an electrical signal into an optical signal and transmits the optical signal to optical transmission network 10 over optical cable 125. The optical signal may transmit throughout the optical transmission network 10 at a high data rate (e.g., OC-192) and may be received by numerous other network terminations for further SONET/SDH frame transferring and processing.

In the examples discussed above in conjunction with FIGS. 2 and 6, synchronization clocks 270 and 650 may be implemented by a two-stage pipeline method or other similar implementation.

Also, in conjunction with FIG. 1–8, parallel data streams may be synchronized to increase the OC level data rate. These parallel data streams may be time synchronized, phase synchronized, and/or synchronized to a similar signal characteristic.

In conjunction with FIG. 1, clock recovery & de-serializer 40 and serializer 110 are shown as separate devices, however, these devices may be combined into a single clock recovery & de-serializer & serializer device to perform their functions.

Also in conjunction with FIG. 1, receive bus 70 may transfer the grouped parallel data streams to a transmit tributary interface to further convert and condition the data streams before further processing by SONET/SDH framer 20.

Similarly, SONET/SDH framer 20 may transfer grouped parallel data streams to a receive tributary interface for converting and conditioning the parallel data streams prior to transferring to ungroup converter.

Various types of optical receivers and transmitters may transfer optical signals to and from optical transmission network 10. In conjunction with FIG. 1, optical receiver 30 and optical transmitter 120 are separate devices, however, an optical transceiver, for example, may both receive and transmit optical signals to and from optical transmission network 10.

The data framer interface described herein is not limited to the hardware embodiment described above; it may find applicability in any computing or processing environment. The data framer interface may be implemented in hardware, software, or a combination of the two. For example, group converter 60 may be implemented using circuitry, such as one or more of programmable logic (e.g., an ASIC), logic gates, a processor, and a memory.

The data framer interface may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The data framer interface may also be implemented as a machine-readable storage medium, configured with a computer program, where, upon execution, instructions in the computer program cause a machine to operate to perform the functions of the data framer interface described above.

Embodiments of the data framer interface may be used in a variety of applications. Although the data framer interface is not limited in this respect, the data framer interface may be implemented with memory devices in microcontrollers, general purpose microprocessors, digital signal processors (DSPs), reduced instruction-set computing (RISC), and complex instruction-set computing (CISC), among other electronic components.

Embodiments of the data framer interface may also be implemented using integrated circuit blocks referred to as core memory, cache memory, or other types of memory that store electronic instructions to be executed by a microprocessor or store data that may be used in arithmetic operations.

Embodiments of the data framer interface may operate as a single data rate (SDR) device using a rising or falling edge, for example, of a 622.08 MHz clock signal. The data framer interface may also, for example, operate as a double data rate (DDR) device using both a rising and falling edge, for example, of a 311.04 MHz clock signal.

Embodiments of the data framer interface may operate, for example, in a clock inversion mode or a data inversion mode. In either case inverters are inserted into the respective signal path, thereby not generating any extra delay skew.

In another embodiment, in conjunction with FIG. 1, parallel-to-parallel converter 50 and group converter 60 may be combined into a single device. Similarly, parallel-to-parallel converter 100 and ungroup converter 90 may be combined into a single device.

A number of embodiments of the invention have been described. Nevertheless, it will be understood that various modifications may be made without departing from the spirit and scope of the invention. For example, data framers using transmission protocols similar to SONET/SDH protocols may be used to interface to optical transmission network 10. Accordingly, other embodiments are within the scope of the following claims.

What is claimed is:

1. A method of transferring a serial data stream to a data framer comprising:
    converting the serial data stream to parallel data streams;
    synchronizing the parallel data streams into synchronized parallel data streams;
    forming at least one group of the synchronized parallel data streams;
    transferring the at least one group of synchronized parallel data streams to the data framer at a transfer rate that corresponds to a size of the at least one group;
    receiving a second group of parallel data streams from the data framer;
    ungrouping the second group of parallel data streams into ungrouped parallel data streams;
    synchronizing the ungrouped parallel data streams into synchronized ungrouped parallel data streams; and
    converting the synchronized ungrouped parallel data streams to a second serial data stream;
    wherein said synchronizing the ungrouped parallel data streams into synchronized ungrouped parallel data streams comprises converting the ungrouped parallel data streams into intermediate ungrouped parallel data streams.

2. A method of transferring a serial data stream to a data framer comprising:
    converting the serial data stream to parallel data streams;
    synchronizing the parallel data streams into synchronized parallel data streams;
    forming at least one group of the synchronized parallel data streams; and
    transferring the at least one group of synchronized parallel data streams to the data framer at a transfer rate that corresponds to a size of the at least one group;
    wherein at least four groups of the synchronized parallel data streams are formed.

3. A method of transferring a serial data stream to a data framer comprising:
    converting the serial data stream to parallel data streams;
    synchronizing the parallel data streams into synchronized parallel data streams;
    forming at least one group of the synchronized parallel data streams; and
    transferring the at least one group of synchronized parallel data streams to the data framer at a transfer rate that corresponds to a size of the at least one group;
    wherein at least sixteen groups of the synchronized parallel data streams are formed.

4. A system for transferring a serial data stream to a data framer, the system comprising circuitry to:
convert the serial data stream to parallel data streams;
synchronize the parallel data streams into synchronized parallel data streams;
form at least one group of the synchronized parallel data streams;
transfer the at least one group of synchronized parallel data streams to the data framer at a transfer rate that corresponds to a size of the at least one group;
receive a second group of parallel data streams from the data framer;
ungroup the second group of parallel data streams into ungrouped parallel data streams;
synchronize the ungrouped parallel data streams into synchronized ungrouped parallel data streams;
convert the synchronized ungrouped parallel data streams to a second serial data scream; and
convert the ungrouped parallel data streams into intermediate ungrouped parallel data streams.

5. A system for transferring a serial data stream to a data framer, the system comprising circuitry to:
convert the serial data stream to parallel data streams;
synchronize the parallel data streams into synchronized parallel data streams;
form at least one group of the synchronized parallel data streams; and
transfer the at least one group of synchronized parallel data streams to the data framer at a transfer rate that corresponds to a size of the at least one group;
wherein at least four groups of the synchronized parallel data streams are formed.

6. A system for transferring a serial data stream to a data framer, the system comprising circuitry to:
convert the serial data stream to parallel data streams;
synchronize the parallel data streams into synchronized parallel data streams;
form at least one group of the synchronized parallel data streams; and
transfer the at least one group of synchronized parallel data streams to the data framer at a transfer rate that corresponds to a size of the at least one group;
wherein at least sixteen groups of the synchronized parallel data streams are formed.

7. An article comprising a machine-readable medium which stores executable instructions to transfer serial data to a data framer, the instructions causing a machine to:
convert the serial data stream to parallel data streams;
synchronize the parallel data streams into synchronized parallel data streams;
form at least one group of the synchronized parallel data streams;
transfer the at least one group of synchronized parallel data streams to the data framer at a transfer rate that corresponds to a size of the at least one group;
receive a second group of parallel data streams from the data framer;
ungroup the second group of parallel data streams into ungrouped parallel data streams;
synchronize the ungrouped parallel data streams into synchronized ungrouped parallel data streams;
convert the synchronized ungrouped parallel data streams to a second serial data stream; and
convert the ungrouped parallel data streams into intermediate ungrouped parallel data streams.

8. An article comprising a machine-readable medium which stores executable instructions to transfer serial data to a data framer, the instructions causing a machine to:
convert the serial data stream to parallel data streams;
synchronize the parallel data streams into synchronized parallel data streams;
form at least one group of the synchronized parallel data streams; and
transfer the at least one group of synchronized parallel data streams to the data framer at a transfer rate that corresponds to a size of the at least one group;
wherein at least four groups of the synchronized parallel data streams are formed.

9. An article comprising a machine-readable medium which stores executable instructions to transfer serial data to a data framer, the instructions causing a machine to:
convert the serial data stream to parallel data streams;
synchronize the parallel data streams into synchronized parallel data streams;
form at least one group of the synchronized parallel data streams; and
transfer the at least one group of synchronized parallel data streams to the data framer at a transfer rate that corresponds to a size of the at least one group;
wherein at least sixteen groups of the synchronized parallel data streams are formed.

10. A method comprising:
converting a serial data stream to parallel data streams;
synchronizing the parallel data streams into synchronized parallel data streams;
forming at least one group of the synchronized parallel data streams;
transferring the group of synchronized parallel data streams to a signal destination at a transfer rate that corresponds to a size of the group;
receiving a second group of parallel data streams from a signal source;
ungrouping the second group of parallel data streams into ungrouped parallel data streams;
synchronizing the ungrouped parallel data streams into synchronized ungrouped parallel data streams; and
converting the synchronized ungrouped parallel data streams to a second serial data stream;
wherein synchronizing the ungrouped parallel data streams into synchronized ungrouped parallel data streams comprises converting the ungrouped parallel data streams into intermediate ungrouped parallel data streams.

11. A method comprising:
converting a serial data stream to parallel data streams;
synchronizing the parallel data streams into synchronized parallel data streams;
forming at least one group of the synchronized parallel data streams; and
transferring the group of synchronized parallel data streams to a signal destination at a transfer rate that corresponds to a size of the group;
wherein at least four groups of the synchronized parallel data streams are formed.

12. A method comprising:
converting a serial data stream to parallel data streams;
synchronizing the parallel data streams into synchronized parallel data streams;

forming at least one group of the synchronized parallel data streams; and transferring the group of synchronized parallel data streams to a signal destination at a transfer rate that corresponds to a size of the group;

wherein at least sixteen groups of the synchronized parallel data streams are formed.

* * * * *